Dec. 2, 1941.　　　　S. J. PARA　　　　2,264,454

AUTOMATIC ADJUSTER FOR HYDRAULIC BRAKES

Filed March 24, 1941　　　　2 Sheets-Sheet 1

Inventor

Stanley James Para

By *Clarence A. O'Brien*

Attorney

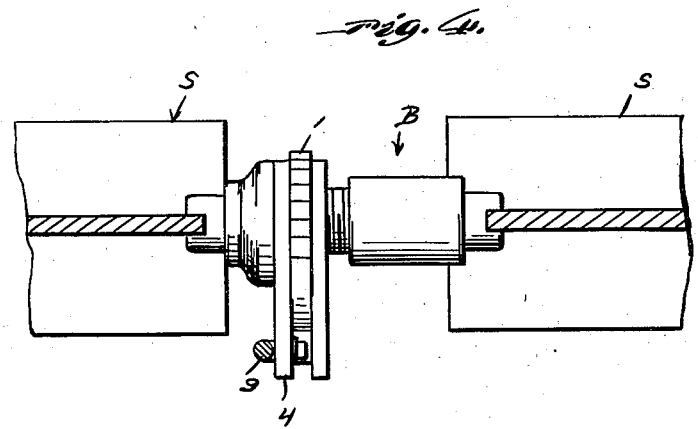
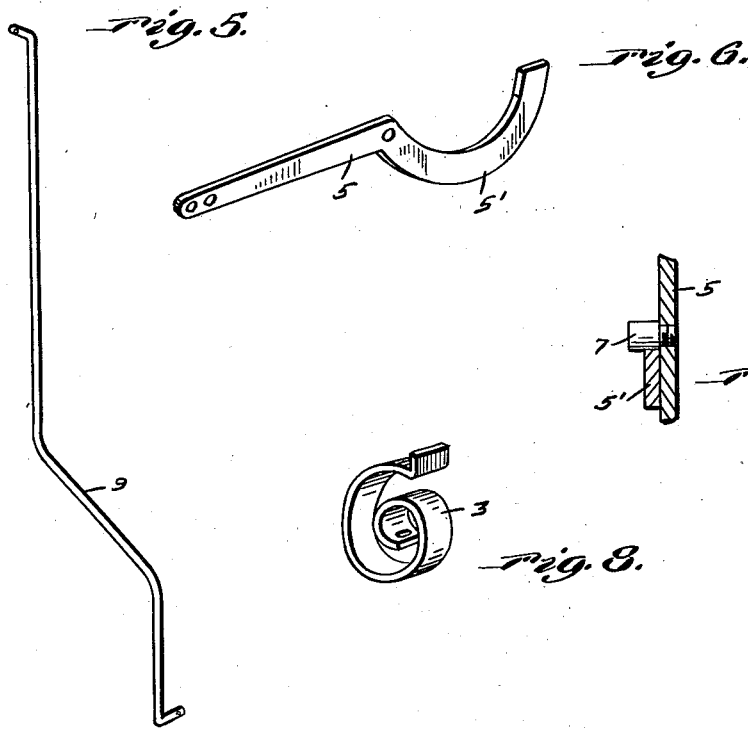

Patented Dec. 2, 1941

2,264,454

UNITED STATES PATENT OFFICE 2,264,454

AUTOMATIC ADJUSTER FOR HYDRAULIC BRAKES

Stanley James Para, Chicago, Ill.

Application March 24, 1941, Serial No. 384,978

1 Claim. (Cl. 188—79.5)

This invention relates to automatic means for adjusting the brakes of a hydraulic system, the general object of the invention being to provide means whereby the adjusting screw between the shoes of the brake member is automatically turned to take up wear, when such wear has occurred in the brake lining or other parts.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts, throughout the several views, and in which:

Figure 4 is a section on the line 4—4 of Figure 1.

Figure 5 is a view of the link forming part of the invention.

Figure 6 is a view of the lever of the invention.

Figure 7 is a section on the line 7—7 of Figure 1.

Figure 8 is a view of the spring.

Figure 1:
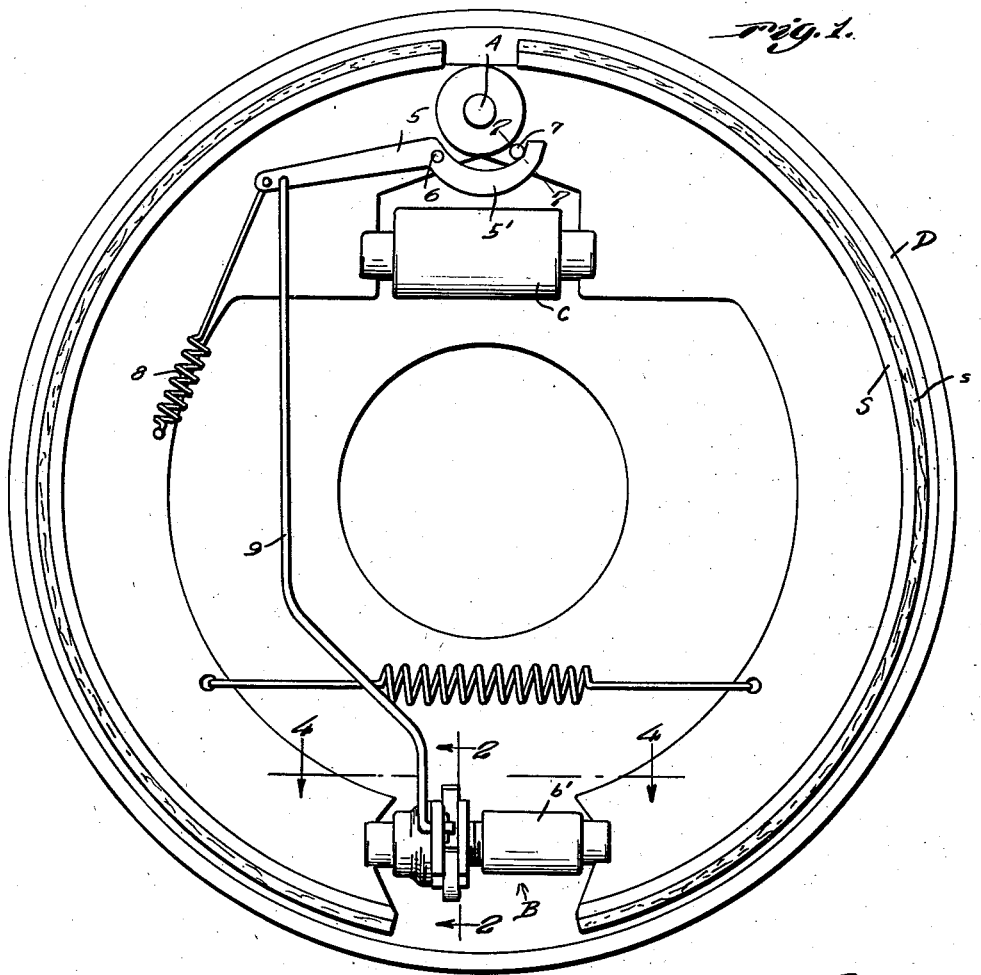
Figure 1 is a view looking toward the inner face of a hydraulic brake drum and showing the invention in use.
Figures 2, 3:
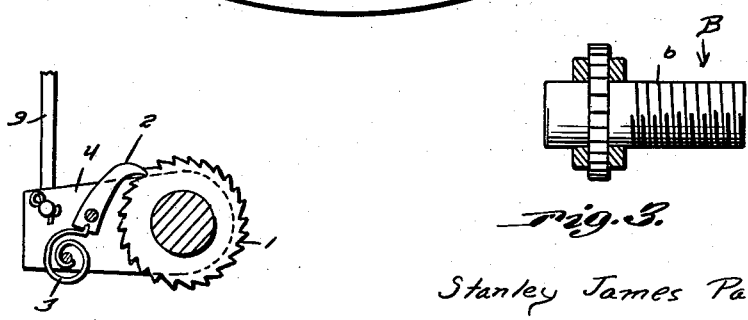
Figure 2 is a section on the line 2—2 of Figure 1.
Figure 3 is a view of the adjusting screw with parts in section.

In these views the letter D indicates a portion of the drum and the letter S the pair of shoes, the linings s of which engage the drum when the shoes are expanded. These shoes anchor on the post A attached to the usual backing plate and they are pressed outwardly in engagement with the drum when fluid is delivered into the hydraulic brake cylinder C. The shoes are adjusted to take up wear of the lining by the adjusting screw B which engages the lower ends of the shoes and which includes a threaded part $b$ threaded into an internally threaded part $b'$.

A ratchet wheel 1 is fastened to the part $b$ of the adjusting screw B and the teeth of which are adapted to be engaged by a dog 2 actuated by a spring 3, the dog being carried by an arm 4 pivoted on a part of the bolt.

A lever 6 is pivoted to one of the shoes at the upper end of the shoe, as shown at 6, the pivot passing through the lever at the junction of the straight part thereof with a curved part 5' thereof. A pin 7 projects from the upper portion of the other shoe and rides on the concave edge of the part 5' of the lever. A spring 8 fastens the outer end of the straight part of the lever to that shoe to which the lever is pivoted and this spring holds the curved part 5' of the lever against the pin 7. A link 9 connects the straight part of the lever with the arm 4.

As the brake shoes are expanded the pin 7 will move the lever 5 which causes the link 9 to move the dog carrying arm 4. However, if the wear on the lining is slight the arm 4 will not move the dog 2 far enough for the dog to engage a new tooth of the wheel 1. However, when the wear is sufficient to cause the parts to move to an extent where the dog 2 will engage a new tooth of the wheel 1, then the adjusting bolt is turned and it will continue to turn step by step until the wear has been taken up.

Thus the wear of the brake mechanism is automatically taken up and there is no need to turn the screw by hand for taking up wear.

The spring 3 is a thermostatic one and will hold the dog 2 out of engagement with the ratchet wheel 1 when the brake parts heat to a certain degree so that when the brake drum shoes heat up to a degree above normal, such heat will cause the spring to lift the dog off of the ratchet wheel and thus the invention will not operate. However, as soon as the parts cool the dog will again engage the ratchet wheel to operate the mechanism. This is important because of the expansion and contraction of the brake drum for if the spring 3 was not used the mechanism would adjust itself until it would lock the brake drum.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a hydraulic brake mechanism including a drum and a pair of shoes, an adjusting screw for taking up wear between the parts and engaging portions of the shoes and means actuated by movement of the shoes for turning the adjusting screw when the wear of the linings of the shoes reaches a certain degree, such means including a lever pivoted to one shoe adjacent the anchor point of the shoe and having a curved part, a pin carried by the other shoe adjacent its anchor point for engaging the curved part to impart movement to the lever when the shoes are expanded, a link connected with the lever, an arm pivoted on the adjusting screw and to which arm the link is connected, a ratchet wheel fastened to the screw, a dog carried by the arm and engaging the ratchet wheel for turning the wheel and the screw when the dog is moved by movement of the arm by the lever and a coiled thermostatic spring connecting the dog with the arm and acting to move the dog out of engagement with the ratchet wheel when the heat of the drum assembly reaches a certain degree.

STANLEY JAMES PARA.